(12) United States Patent
Lee

(10) Patent No.: US 6,189,395 B1
(45) Date of Patent: Feb. 20, 2001

(54) CHANGE GEAR TRANSMISSION DEVICE AND SCANNER EMPLOYING SUCH DEVICE

(75) Inventor: Pen-Jung Lee, Taipei (TW)

(73) Assignee: Teco Image Systems Co., Ltd., Taipei (TW)

( * ) Notice: Under 35 U.S.C. 154(b), the term of this patent shall be extended for 0 days.

(21) Appl. No.: 09/372,620

(22) Filed: Aug. 12, 1999

(51) Int. Cl.[7] ................................................. H04N 1/10
(52) U.S. Cl. .............................. 74/332; 74/342; 358/497
(58) Field of Search ................................. 399/211, 212; 358/497; 74/332, 342; 475/298, 299

(56) References Cited

U.S. PATENT DOCUMENTS

| | | | |
|---|---|---|---|
| 1,336,796 | * 4/1920 | Taylor, Jr. | 74/473.12 |
| 1,515,850 | * 5/1924 | Fawick | 74/332 |
| 4,377,337 | * 3/1983 | Beck | 399/211 |
| 4,965,638 | * 10/1990 | Hediger | 399/211 X |
| 5,643,129 | * 7/1997 | Richardson | 475/298 X |
| 5,831,749 | * 11/1998 | Tseng et al. | 358/497 X |
| 5,845,180 | * 12/1998 | Tsai | 399/211 |
| 5,926,290 | * 7/1999 | Chen et al. | 358/496 |
| 6,002,508 | * 12/1999 | Mai | 358/497 X |

\* cited by examiner

*Primary Examiner*—Charles A Marmor
*Assistant Examiner*—Ankur Parekh
(74) *Attorney, Agent, or Firm*—Rosenberg, Klein & Lee

(57) ABSTRACT

A change gear transmission device for a scanner comprises a motor, a first gear, a second gear and a third gear. The second gear and the third gear are movably arranged within the scanner and can be moved in axial direction. The first gear is coaxially connected with the motor. The second gear and the third gear are arranged on one end of the driving shaft of the scanner and have different tooth number. The first gear is optionally engaged with the second gear or the third gear by the movement of the second gear and the third gear. In a preferred embodiment of the device, the second gear is a spur gear and the third gear is an indent gear (ring gear). Therefore, the inventive change gear transmission device can provide both high speed and high accuracy ability to the scanner with low/high resolution.

5 Claims, 4 Drawing Sheets

CHANGE GEAR TRANSMISSION DEVICE AND SCANNER EMPLOYING SUCH DEVICE

FIELD OF THE INVENTION

The present invention relates to a change gear transmission device for scanner, particularly to a change gear transmission device for scanner with high/low resolution option, by which the high speed and high accuracy performance is achieved.

BACKGROUND OF THE INVENTION

The conventional transmission device for scanner with high/low resolution option generally uses micro-step means to drive motor for obtaining high resolution. For examples, the micro-step means can be single step for 300 dpi, half step for 600 dpi, ¼ step for 1200 dpi and ⅛ step for 2400 dpi resolution. However, the motor has best rotation accuracy for single step because two phases are simultaneously magnetically excited. The motor has less rotation accuracy for half step operation because one/two phases magnetically excited are alternatively performed. For ¼ step or ⅛ step operation, voltage difference magnetically excited are used, thus degrading the accuracy, especially for the high-resolution printing such as above 1200 dpi. Therefore, the registration is influenced. The scanner can not have high scanning speed or need larger motor torque for scanning in low-resolution mode when single step operation is used.

It is an object of the present invention to provide a change gear transmission device for scanner with high/low resolution option, by which the high speed and high accuracy performance is achieved.

To achieve above object, the present invention provides a change gear transmission device for a scanner comprising a motor, a first gear, a second gear and a third gear. The second gear and the third gear are movably arranged within the scanner and can be moved in axial direction. The first gear is connected to the axis of motor. The second gear and the third gear are arranged on one end of the driving shaft of the scanner and have different tooth number. The first gear is optionally engaged with the second gear or the third gear by the movement of the second gear and the third gear. Therefore, the inventive change gear transmission device can provide both high speed and high accuracy ability to the scanner with low/high resolution.

The various objects and advantages of the present invention will be more readily understood from the following detailed description when read in conjunction with the appended drawing, in which:

DETAIL DESCRIPTION OF PREFERRED EMBODIMENT

Figure 1:
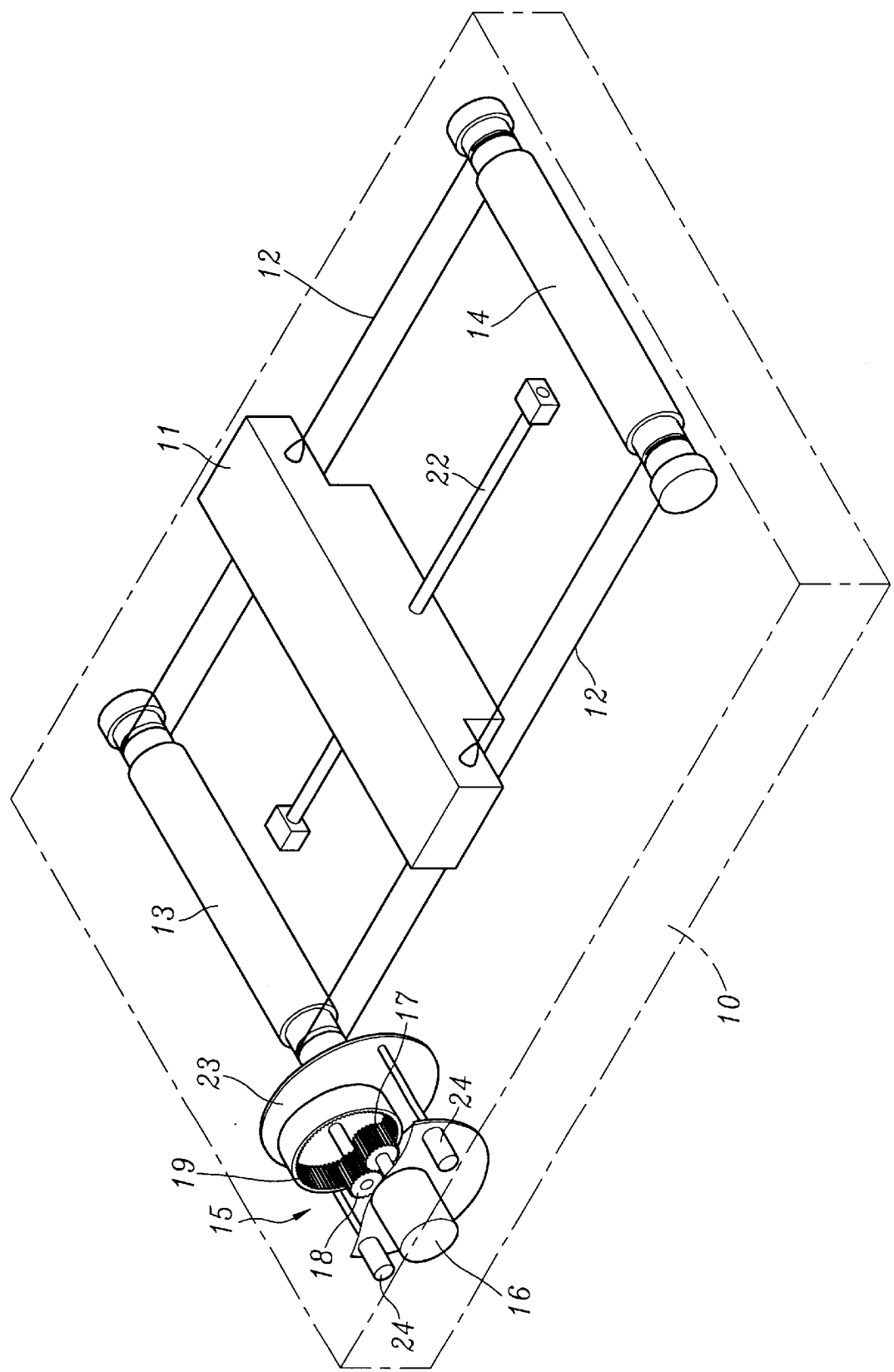
FIG. 1 is the perspective view of the present invention.
Figure 2:
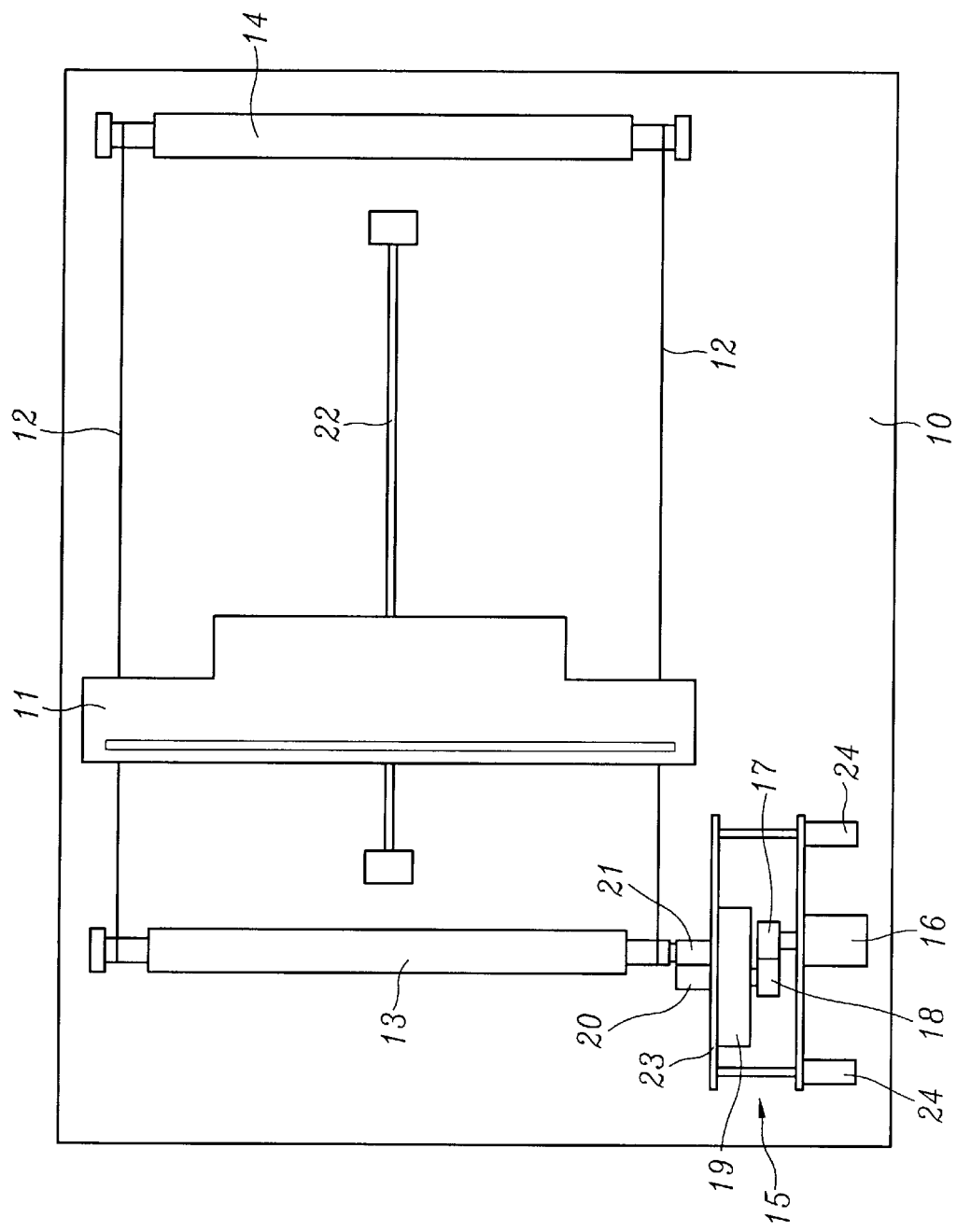
FIG. 2 is the top view of present invention.

With reference now to FIGS. 1 and 2, the present invention provides a change gear transmission device for scanner. The scanner comprises at least a base 10, a scanning module 11 movably arranged on the base 10, two flexible elements 12, a driving shaft 13 and a driven shaft 14. The base 10 has a guiding rod 22 such that the scanning module 11 slidingly mounted on the guiding rod 22. The scanning module 11 is a charge coupled device (CCD) and two flexible elements 12 made of belt or wire are arranged on both sides of the scanning module 11. The driving shaft 13 and the driven shaft 14 are arranged on opposite sides of the base 10. The two flexible elements 12 are wrapped around both ends of the driven shaft 14 and the driving shaft 13. A transmission means 15 is arranged on the base 10 within the scanner and rotates the driving shaft 13 such that the scanning module 11 is moved along the scanning path with the help of the two flexible elements 12. The present invention is intended to improve the transmission means 15.

The transmission means 15 according to the present invention comprises at least a motor 16, a first gear 17, a second gear 18 and a third gear 19. The motor 16 is fixed on a predetermined position on the base 10. The second gear 18 and the third gear 19 are co-axially arranged and integrally formed, respectively, and can move along axial direction such that the first gear 17 can be optionally engaged with the second gear 18 or the third gear 19. The first gear 17 is a spur gear and linked with the axis of the motor 16 to convey the output power of the motor 16. The second gear 18 and the third gear 19 are arranged on one side of the driving shaft 13 and the second gear 18 is arranged on outer side of the third gear 19. The second gear 18 is a spur gear and the third gear 19 is an indent gear (also commonly referred to in the art as a "ring gear"). The second gear 18 and the third gear 19 are fixed on a movable stage 23, which has two magnetic switches 24 arranged within the scanner. The movable stage 23 is driven by the two magnetic switches 24. Moreover, the second gear 18 and the third gear 19 have different number of teeth. The movable stage 23 is linked to the first gear 17 through a linking means composed of a fourth gear 20 and a fifth gear 21 such that the power of the motor 16 can be conveyed to the driving shaft 13. The fourth gear 20 is fixed on the movable stage 23 and connected with the second gear 18 and the third gear 19. Moreover, the fourth gear 20 is co-axially arranged with the second gear 18 and the third gear 19. The fifth gear 21 is arranged on one end of the driving shaft 13 and the fourth gear 20 is engaged with the fifth gear 21, whereby the first gear 17 can be optionally engaged with the second gear 18 or the third gear 19 through the movement of the second gear 18 and the third gear 19.

Figure 3:
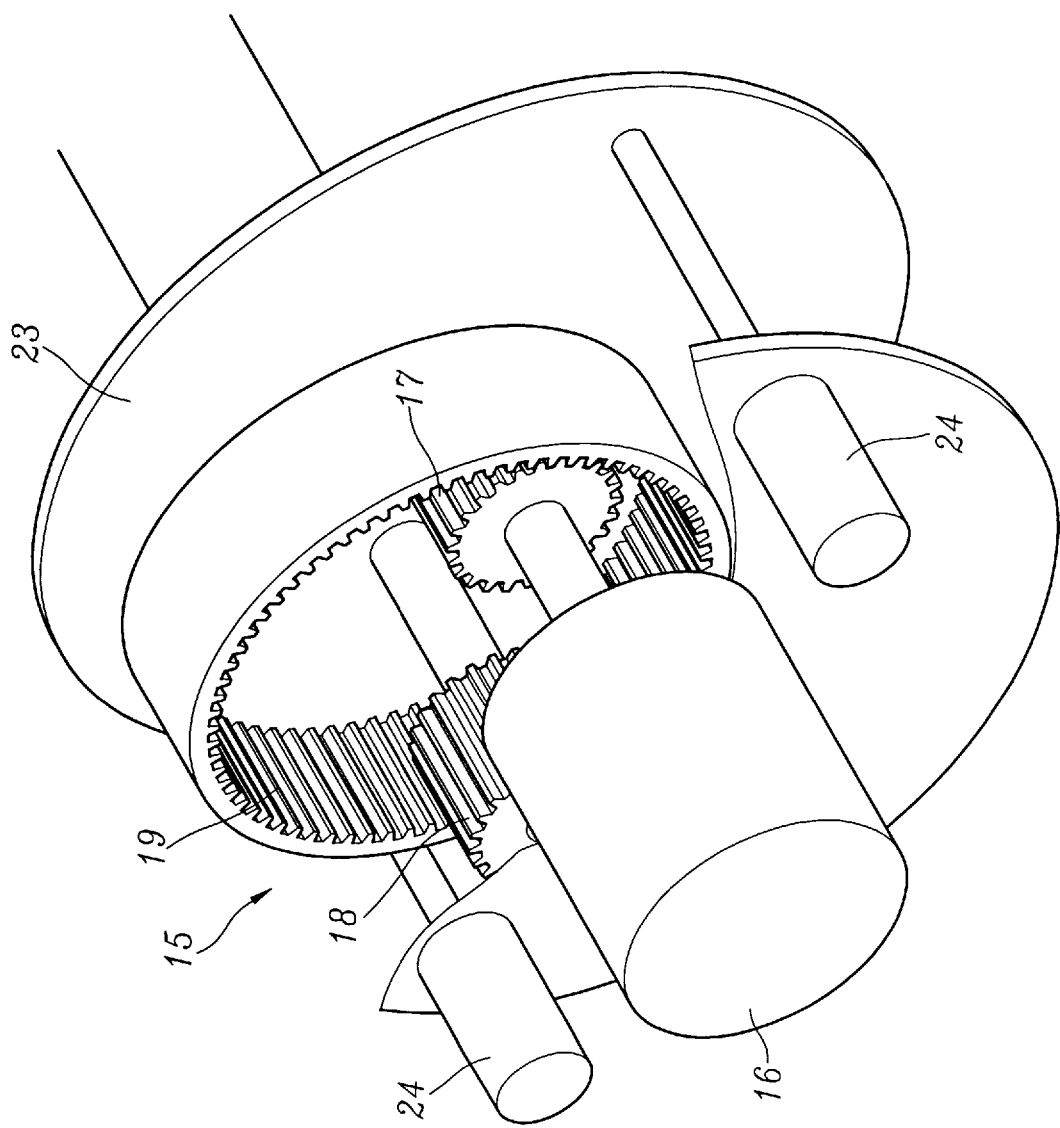
FIG. 3 is a perspective view of the present invention in change speed state.
Figure 4:
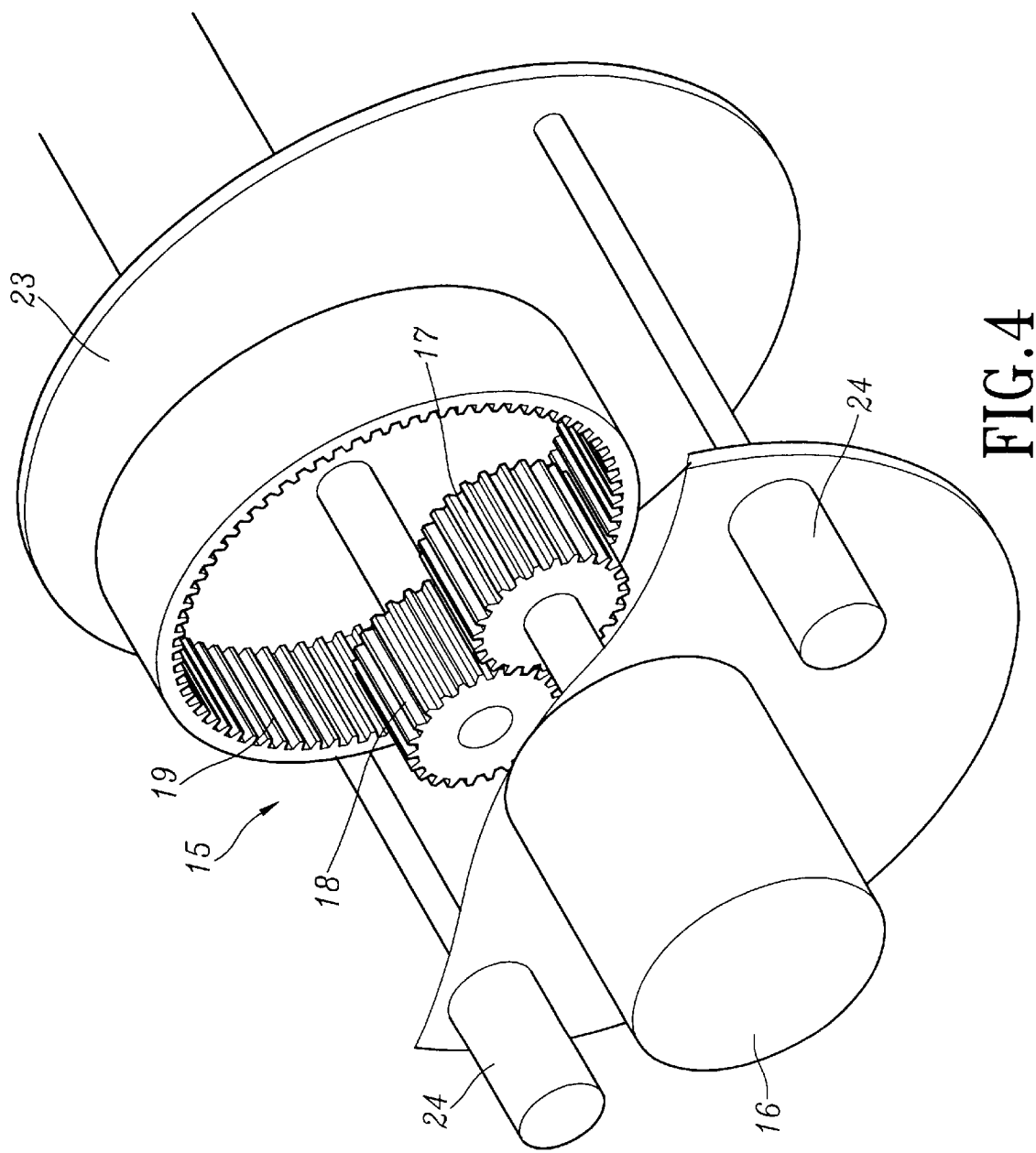
FIG. 4 is another perspective view of the present invention in change speed state.

As shown in FIG. 3, when the second gear 18 and the third gear 19 are driven by the magnetic switches 24 to move away from the driving shaft 13, the first gear 17 on the axis of the is engaged with the third gear 19. Therefore, the power of the motor 16 is transmitted to the driving shaft 13 for a low speed rotation through the first gear 17, the third gear 19, the fourth gear 20 and the fifth gear 21. As shown in FIG. 4, when the second gear 18 and the third gear 19 are driven by the magnetic switches 24 to opposite direction, the first gear 17 on the axis of the is engaged with the second gear 18. Therefore, the power of the motor 16 is transmitted to the driving shaft 13 for a high speed rotation through the first gear 17, the second gear 18, the fourth gear 20 and the fifth gear 21.

In the present invention, the first gear 17 can be optionally engaged with the second gear 18 or the third gear 19 of different size (different tooth number) whereby the driving shaft 13 has different rotation speed for the scanner with low or high resolution. More particularly, by the present invention, the scanning speed is increased when the resolution is not critical, and the scanning speed is decreased when high resolution is required, for example, above 1200 dpi. Therefore, the registration error is overcome by the inventive change gear transmission device for scanner.

To sum up, the present invention provides a change gear transmission device for a scanner, which comprises a motor, a first gear, a second gear and a third gear. The second gear and the third gear are movably arranged within the scanner and can be moved in axial direction. The first gear is connected to the axis of motor. The second gear and the third gear are arranged on one end of the driving shaft of the scanner and have different tooth number. The first gear is optionally engaged with the second gear or the third gear by the movement of the second gear and the third gear. Therefore, the inventive change gear transmission device can provide both high speed and high accuracy ability to the scanner with low/high resolution.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A scanner including a change gear transmission device, comprising a base, a driving shaft rotatable mounted in said base, a scanning module mounted to said base for displacement thereon responsive to rotation of said driving shaft and a transmission coupled to said driving shaft; said transmission including at least a motor, a first gear, a second gear and a third gear, said second gear and said third gear being axially and laterally spaced one from the other and linked with a driving means for mutual axial displacement, said second and third gears being connected to one end of said driving shaft by a linking means; said first gear being coaxially connected with said motor; said second gear and said third gear being selectively linearly moved solely in an axial direction by said driving means between a first position and a second position, said first gear being engaged with said second gear in said first position and said first gear being engaged with said third gear in said second position.

2. The scanner as in claim 1, wherein said driving means includes a magnetic switch.

3. The scanner as in claim 1, wherein said second gear and said third gear are fixed on a movable stage connected to said driving means; said driving means being disposed within said base and driving said movable stage, said second gear and said third gear.

4. The scanner as in claim 1, wherein said linking means comprises a fourth gear and a fifth gear, said fourth gear being connected to said second gear and said third gear; said fifth gear being fixed on one end of said driving shaft and engaged with said fourth gear.

5. A change gear transmission device for a scanner, comprising at least a motor, a first gear, a second gear and a third gear; said second gear and said third gear being linked with a driving means and being connectable to one end of a driving shaft of said scanner by a linking means; said first gear and second gear being spur gears and said third gear being an indent gear; said first gear being coaxially connected with said motor; said second gear and said third gear being moved by said driving means such that said first gear is optionally engaged with said second gear or said third gear.

* * * * *